H. KALLER.
Corn-Planter.
No. 29,176.
Patented July 17 1860.
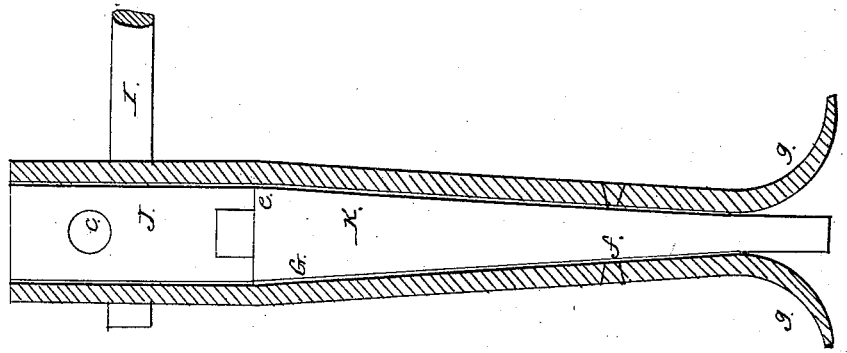
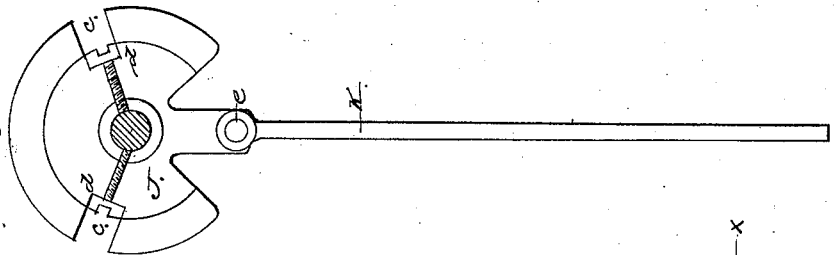
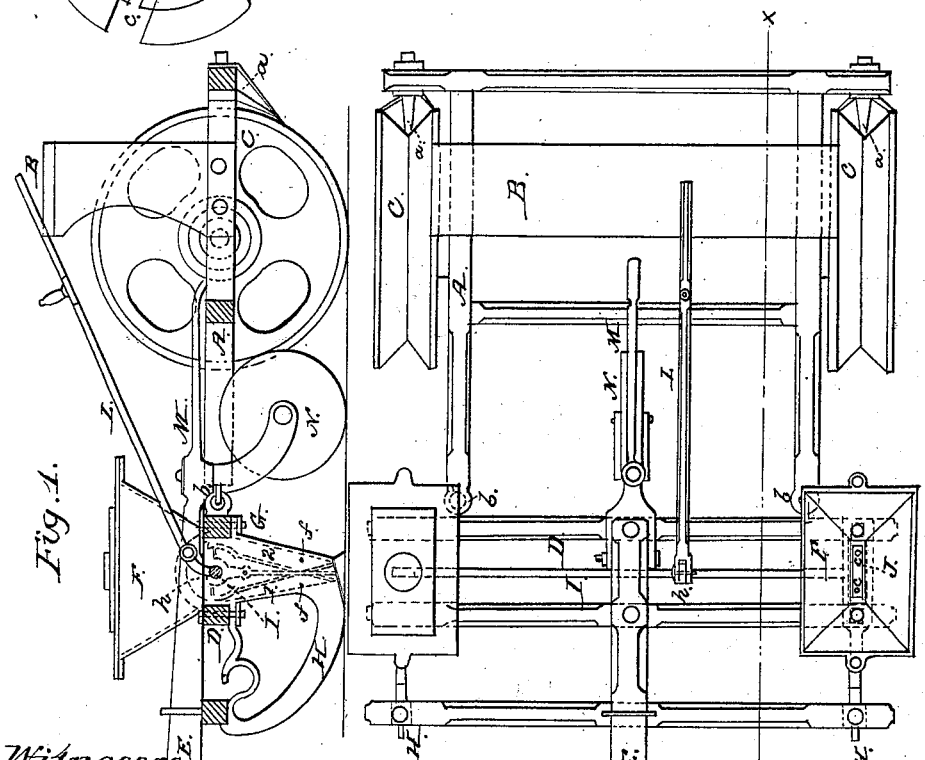

UNITED STATES PATENT OFFICE.

HERMANN KALLER, OF PERRY, ILLINOIS.

IMPROVEMENT IN SEEDING-MACHINES.

Specification forming part of Letters Patent No. 29,176, dated July 17, 1860.

*To all whom it may concern:*

Be it known that I, HERMANN KALLER, of Perry, in the county of Pike and State of Illinois, have invented certain new and useful Improvements in Seeding-Machines; and I do hereby declare that the following is a full, clear, and exact description of the same, reference being had to the annexed drawings, making a part of this specification, in which—

Figure 1 is a side sectional view of my invention, taken in the line $x\ x$, Fig. 2. Fig. 2 is a plan or top view of the same. Fig. 3 is a detached view of one of the seed-distributing wheels with sliding holding-bar attached. Fig. 4 is a back sectional view of one of the spouts.

Similar letters of reference indicate corresponding parts in the several figures.

This invention relates to an improvement on a seeding-machine for which Letters Patent were granted to me bearing date November 2, 1858.

The object of the within-described invention is to facilitate and perfect the seed-dropping operation, and also to render the shares capable of being more readily raised by the driver than hitherto.

To enable those skilled in the art to fully understand and construct my invention, I will proceed to describe it.

A represents a rectangular frame, on which the driver's seat B is placed, said frame being mounted on wheels C C, having concave peripheries. To the back part of the frame A scrapers *a a* are attached, which act one against each wheel C. The front end of the frame A is connected by eyes or links *b* to a frame, D, to which the draft-pole E is attached. This frame D has two seed-boxes, F F, attached to it, one at each side, and to the bottom of each seed-box a spout, G, is attached. The lower ends of these spouts are connected in the furrow shares or runners H, which are curved upward and are attached to the front part of the frame D.

I is a shaft which has its bearings in the upper parts of the spouts G G. On each end of this shaft there is a wheel, J. These wheels are fitted in the upper parts of the spouts G, and each wheel has two holes or seed-cells, *c c*, made in it, in the bottom of each of which there is a screw, *d*, for the purpose of regulating the capacity of the holes as may be required. (See Fig. 3.)

To the lower part of each wheel J a bar, K, is attached by a joint, *e*. These bars K are equal in width to the interior of the spouts, and each bar, near its lower end, is fitted between two transverse rods, *f f*, as shown in Fig. 1. The bars K extend down nearly to the bottom of the spouts G G, the lower ends of which are of flaring form, or project laterally outward, as shown clearly at *g* in Fig. 4.

To the shaft I an arm, *h*, is attached, said arm having a lever, L, connected to its end, which lever extends back to the driver's seat.

To the back part of the frame D there is connected a bar, M, said bar having a caster-wheel, N, attached to it. The bar M extends back sufficiently far to be within reach of the feet of the driver.

The operation is as follows: As the machine is drawn along, the driver on the seat B draws the lever L back and forth, and the holes or cells *c* in the wheels J will alternately discharge their seed into the spouts G, and it will be seen that seed will be discharged into the spouts at each movement of the lever L. The bars K hold the seed in the bottoms of the spouts as it is discharged from the holes *c*, and the bars have two inclined positions, as shown by the dotted lines 1 2, Fig. 1, a position for each movement of the wheels J, so that the bars, as the holes *c* in one part of the wheels J pass upward into the seed-boxes to be refilled, will liberate the seed previously dropped by said holes, and catch and retain at the bottoms of the spouts the seed dropped by the other holes *c* as they pats down and out from the seed-boxes. These bars K, it will be seen, perform the same functions as in the machine formerly patented by me; but they had but a single movement, as the wheel J only dropped seed at a complete vibration of the lever. By this within-described arrangement of the two holes *c c* in the wheels J, and the slide K, fitted between the two rods *f*, the seed is distributed at each movement of the lever L. When it is necessary to elevate the spouts G and runners H the driver simply depresses the lever M with his foot, and, owing to the flexible or jointed connection formed by the eyes or links *b* between the two frames A D, the frame D is allowed to rise, and with it the spouts G and runners H. The bars K, by their operation as seed-holders, also serve as clearers, and prevent the spouts G from being choked or clogged.

I do not claim the bars K, when separately considered, for they may be seen in the machine formerly patented by me; but I do claim and desire to secure by Letters Patent—

The arrangement of the rods $ff$, bars K, distributing-wheels J, spouts G, runners H, levers L M, caster-wheel N, and frames A D, as and for the purpose herein shown and described.

HERMANN KALLER.

Witnesses:
   E. R. REEVES,
   J. S. HICKEY.